（12）United States Patent
Chou (10) Patent No.: US 7,948,537 B2
(45) Date of Patent: May 24, 2011

(54) METHOD FOR RESETTING IMAGE SENSING AND IMAGE SENSING DEVICE USING THE SAME

(75) Inventor: Kuo-Yu Chou, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 448 days.

(21) Appl. No.: 11/962,124

(22) Filed: Dec. 21, 2007

(65) Prior Publication Data

US 2009/0122168 A1   May 14, 2009

(30) Foreign Application Priority Data

Nov. 14, 2007   (TW) ................................ 96143019 A (51) Int. Cl.
*H04N 3/14* (2006.01)
*H04N 5/335* (2011.01)
*H04N 5/238* (2006.01)

(52) U.S. Cl. ...................... 348/296; 348/294; 348/367

(58) Field of Classification Search ........... 348/294–310
See application file for complete search history.

(56) References Cited

U.S. PATENT DOCUMENTS

| 6,529,242 | B1 * | 3/2003 | Panicacci ...................... 348/308 |
| 6,847,398 | B1 * | 1/2005 | Fossum ......................... 348/296 |
| 7,619,670 | B2 * | 11/2009 | Shah .............................. 348/296 |
| 2005/0057674 | A1 * | 3/2005 | Krymski et al. .............. 348/296 |
| 2006/0238632 | A1 * | 10/2006 | Shah .............................. 348/296 |

* cited by examiner

*Primary Examiner* — Sinh Tran
*Assistant Examiner* — Christopher K Peterson
(74) *Attorney, Agent, or Firm* — Jianq Chyun IP Office (57) ABSTRACT

A method for resetting image sensing and an image sensing device using the same are provided. The method for resetting image sensing includes generating a plurality of reset signals and a plurality of control signals, and using the reset signals and the control signals to control a pixel array to reset and expose. The pixel array has a plurality of pixel blocks, each of the pixel blocks has a plurality of pixel sensing units. When the plurality of pixel sensing units of one of the pixel blocks expose to acquire a plurality of sensing signals sequentially, the plurality of pixel sensing units of another one of the pixel blocks are reset.

6 Claims, 8 Drawing Sheets

METHOD FOR RESETTING IMAGE SENSING AND IMAGE SENSING DEVICE USING THE SAME

CROSS-REFERENCE TO RELATED APPLICATION

This application claims the priority benefit of Taiwan application serial no. 96143019, filed on Nov. 14, 2007. The entirety of the above-mentioned patent application is hereby incorporated by reference herein and made a part of this specification.

BACKGROUND OF THE INVENTION

1. Field of the Invention

The present invention generally relates to an image sensing method, in particular, to a resetting method and an image sensing device applicable to a complementary metal-oxide-semiconductor (CMOS) image sensor.

2. Description of Related Art

As semiconductor and photoelectric techniques develop, recently, more and more digital cameras, digital monitors, or digital video cameras exist in our life. The digital camera, the digital monitor, the digital video camera, or other photographing devices need photosensitive element to convert sensed light signal to electrical signal for output. Generally, the photosensitive element is mostly a charge coupled device (CCD) or a CMOS image sensor. Although the image quality of the CCD is better than the photographing device of the CMOS image sensor, cost of the CCD is higher than the cost of the CMOS image sensor, so many electronic photographing devices still adopt the CMOS image sensor.

The image sensor usually has image lag, and the image lag and dark current often affect with each other. Manufacturer of the image sensor can change process parameters, for example, change characteristics of the transfer gate, so as to adjust the image lag and the dark current of the image sensor, but it is impossible to modify two parameters at the same time. When it intends to reduce the image lag, the dark current is increased; on the contrary, when it intends to reduce the dark current, the image lag is deteriorated. In brief, the image lag and the dark current are of a trade-off relation.

In a conventional method, a voltage pump is used to modify the image lag without increasing the dark current. If the image lag is modified in the process, it is possible to reduce the dark current of the image sensor by using a negative voltage pump. If the dark current is modified in the process, it is possible to reduce the dark current of the image sensor by using a positive voltage pump. However, the cost and the power consumption are increased along with the utilization of the voltage pump, in addition, noises such as random noise, ripple noise, and substrate noise may also increase.

Figure 1:
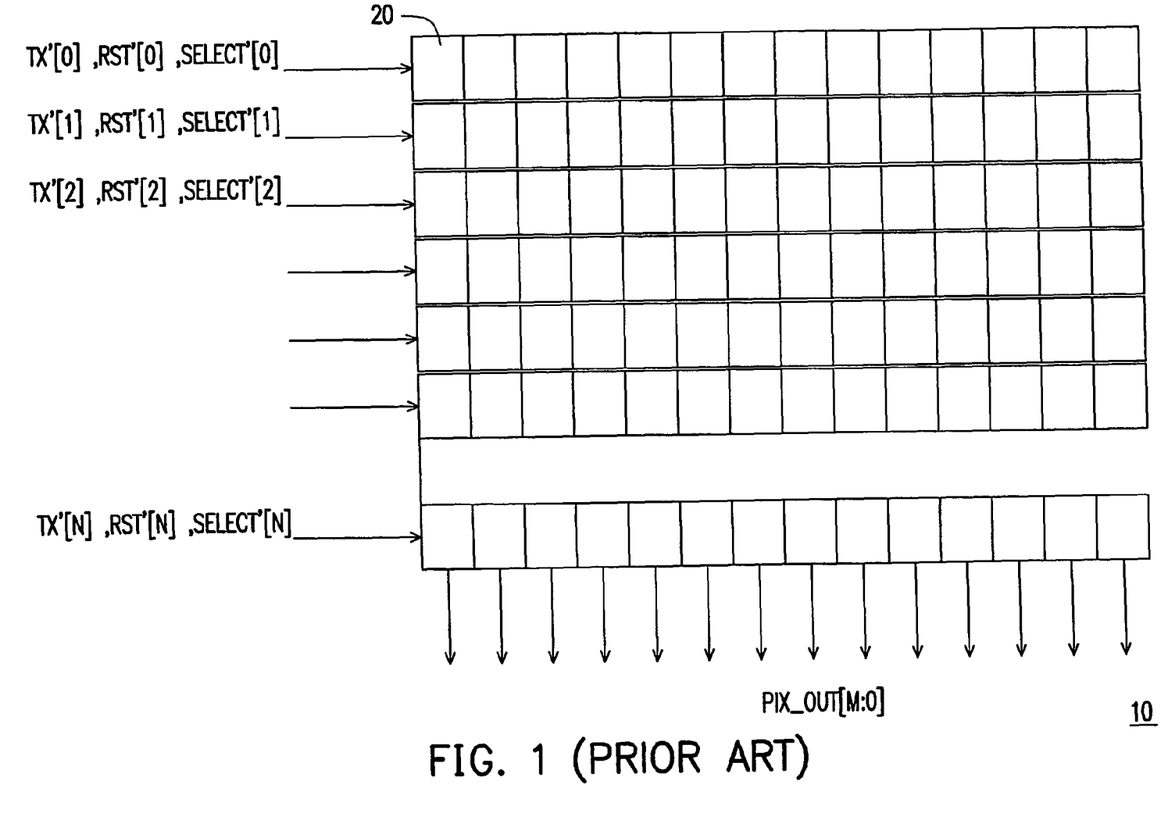
FIG. 1 is a circuit diagram of a conventional CMOS pixel array 10.

Referring to FIG. 1, a circuit diagram of a conventional CMOS pixel array 10 is shown. The CMOS pixel array 10 includes (N+1)*(M+1) CMOS image sensing units 20. M+1 CMOS image sensing units 20 of the $i^{th}$ row are controlled by a reset signal RST'[i], a control signal TX'[i], and a selecting signal SELECT'[i], in which i is an integer from 0 to N. Firstly, when the reset signal RST'[i] is in a high level, the control signal TX'[i] is in a high level, and the selecting signal SELECT'[i] is in a low level, the M+1 CMOS image sensing units 20 of the $i^{th}$ row are reset. Next, when the reset signal RST'[i] is in a high level, the control signal TX'[i] is in a low level, and the selecting signal SELECT'[i] is in high level, the M+1 CMOS image sensing units 20 of the $i^{th}$ row output signal level after resetting. Finally, when the reset signal RST'[i] is in a low level, the control signal TX'[i] is in a high level, and the selecting signal SELECT'[i] is in a high level, the M+1 CMOS image sensing units 20 of the $i^{th}$ row output sensing signals PIX_OUT[M:0] after exposing, in which PIX_OUT[M:0] represents all the signals of PIX_OUT[0]-PIX_OUT[M].

Figure 2:
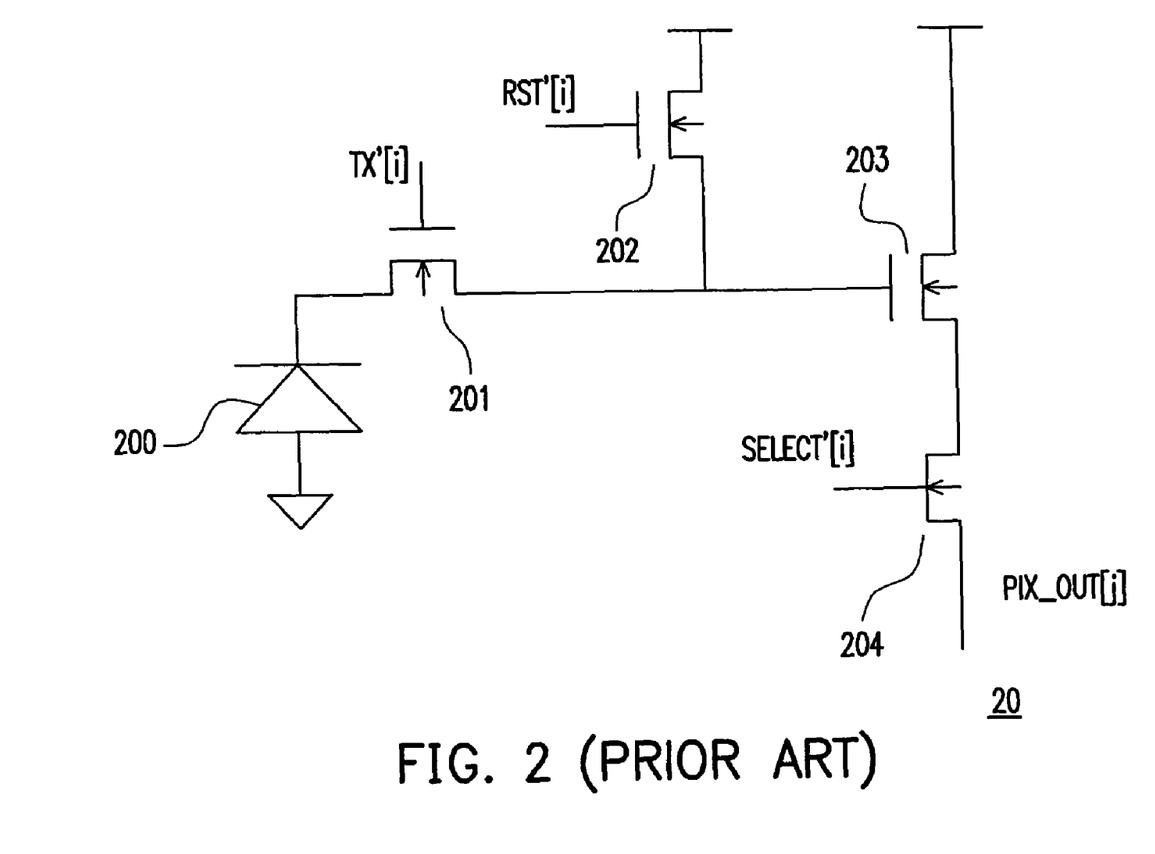
FIG. 2 is a circuit diagram of a CMOS image sensing unit 20.

Referring to FIG. 2, a circuit diagram of the CMOS image sensing unit 20 is shown. As shown in FIG. 2, the CMOS image sensing unit 20 includes a photodiode 200, and transistors 201, 202, 203, and 204. The transistor 201 is coupled to the photodiode 200, the transistor 202 is coupled to the transistor 201, the transistor 203 is coupled to the transistor 202, and the transistor 204 is coupled to the transistor 203. The photodiode 200 is used for exposing, so as to acquire the sensing signal, the transistor 201 is controlled by the control signal TX'[i], the transistor 202 is controlled by the reset signal RST'[i], the transistor 204 is controlled by the selecting signal SELECT'[i], and the transistor 204 is used for outputting the sensing signal PIX_OUT[j] and the signal level after resetting, in which j is an integer from 0 to M.

Figure 3:
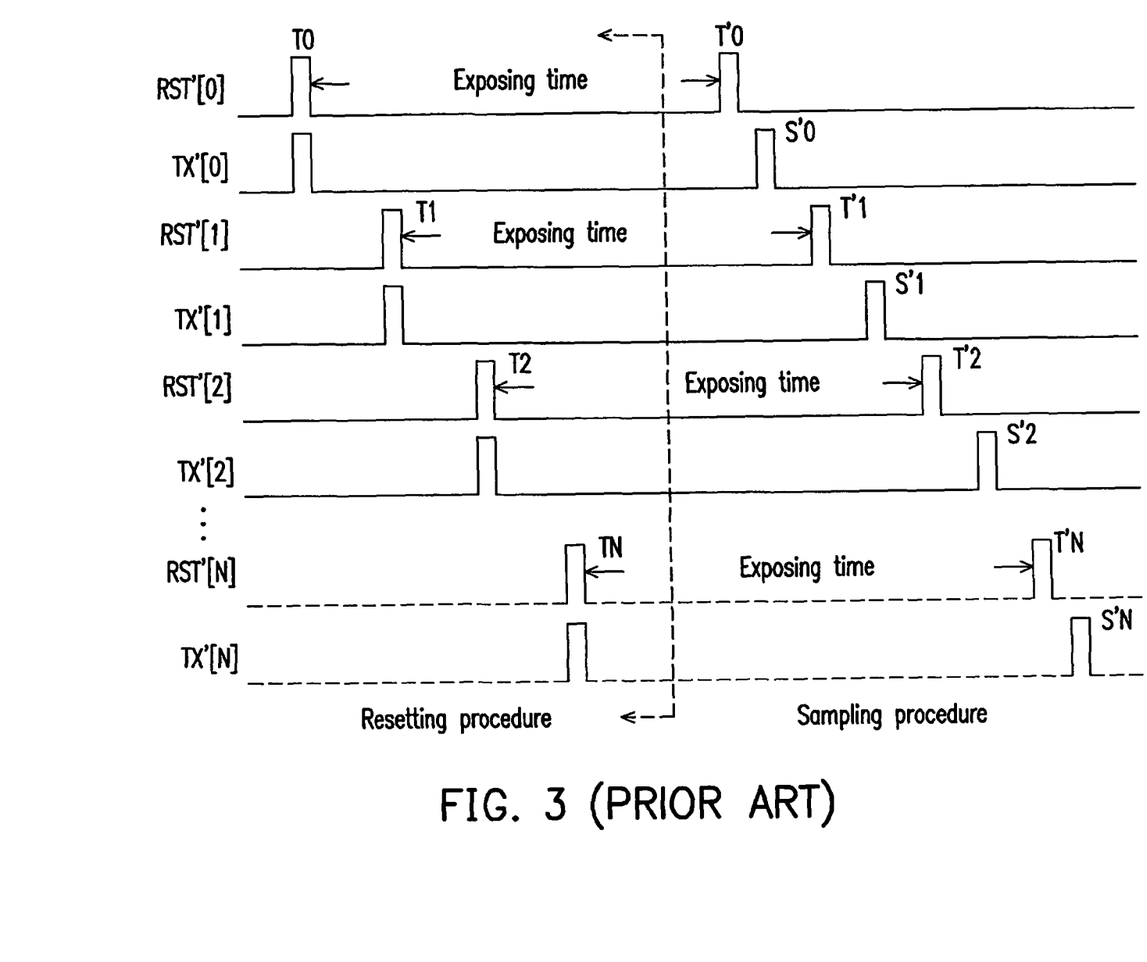
FIG. 3 is an diagram showing waveforms of the reset signals and the control signals during resetting, exposing, and sampling of the conventional CMOS pixel array 10.

Referring to FIG. 3, which is a diagram showing waveforms of the reset signals and the control signals during resetting, exposing, and sampling of the conventional CMOS pixel array 10. At time Ti (the scope of i is the same as the above scope, that is, i is an integer between 0 and N), RST'[i]=High and TX'[i]=High (SELECT'[i]=Low, and SELECT'[i] is not shown in FIG. 3), and the M+1 CMOS image sensing units 20 of the $i^{th}$ row are reset. However, from time Ti to T'i, the M+1 CMOS image sensing units 20 of the $i^{th}$ row expose. At time T'i, RST'[i]=High and TX'[i]=Low (SELECT'[i]=High), and the M+1 CMOS image sensing units 20 of the $i^{th}$ row output the signal level after resetting. Finally, at time S'i, RST'[i]=Low and TX'[i]=High (SELECT'[i]=High), and the M+1 CMOS image sensing units 20 of the $i^{th}$ row output the sensing signals PIX_OUT[M:0] acquired by exposing.

In FIG. 3, exposing time required by the M+1 CMOS image sensing units 20 of each row is the same, and generally, the time required by resetting cannot be too long, approximately between 1 and 10 μs. Therefore, in order to prevent the image lag, the above described voltage pump is used to accelerate the resetting speed.

The cost and the power consumption increase when the voltage pump is used, in addition, the noises such as random noise, ripple noise, and substrate noise also increase. Therefore, in order to reduce the noises and to prevent the image lag, the present invention provides a method for resetting an image sensor by using block as a unit and an image sensing device using the same.

SUMMARY OF THE INVENTION

Accordingly, the present invention is directed to a method for resetting an image sensing and an image sensing device using the same, capable of reducing image lap with out using voltage pump, such that power consumption is lower.

The present invention is directed to an image sensing device with small image lag and low power consumption.

The present invention provides a method for resetting image sensing, which includes generating a plurality of reset signals and a plurality of control signals. Next, the reset signals and the control signals are used to sequentially control the pixel array to reset and expose. The pixel array has a plurality of pixel blocks, in which each pixel block has a plurality of pixel sensing units. When the plurality of pixel sensing units of one of the pixel blocks expose to acquire a plurality of sensing signals sequentially, the pixel sensing units in another pixel block are reset at the same time.

According to an embodiment of the present invention, the method is applicable to a CMOS image sensor.

The present invention provides an image sensing device, which includes a decoder and a pixel array. The pixel array is coupled to the decoder. The decoder is used for generating a plurality of reset signals and a plurality of control signals. The pixel array is controlled by the plurality of reset signals and control signals, and the pixel array has a plurality of pixel blocks, in which each pixel block has a plurality of pixel sensing units. When the plurality of pixel sensing units of one of the pixel blocks expose to acquire a plurality of sensing signals sequentially, the plurality of pixel sensing units of another pixel block are reset at the same time.

According to an embodiment of the present invention, the image sensing unit is a CMOS image sensor.

In the resetting method and the image sensing device of the present invention, when a pixel block exposes, another one pixel block is reset at the same time, so as to prevent the image lag, and thus the voltage pump is not required. In the method and the device, resetting time is longer than that of the conventional method and device, such that the voltage pump is not required, and the power consumption and noise are lower than that of the conventional method and device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention are characterized in that the pixel array is divided into a plurality of sectors, and a pixel block is reset at the same time, so as to prevent the image lag without using a voltage pump.

Figure 4:
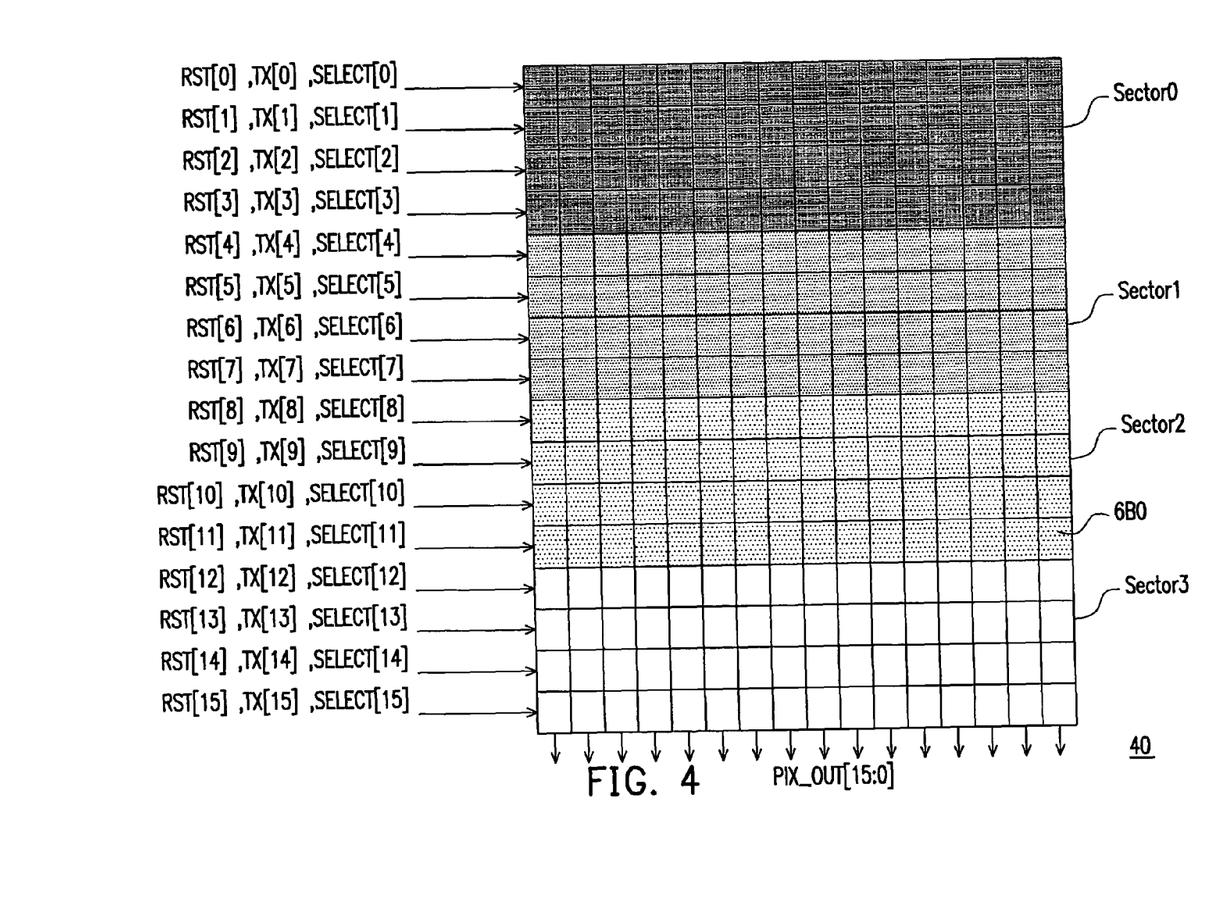
FIG. 4 is a circuit diagram of an embodiment of a pixel array 40 using the method of the present invention.

Referring to FIG. 4, a circuit diagram of an embodiment of a pixel array 40 using the method of the present invention is shown. As shown in FIG. 4, the pixel array 40 includes a plurality of image sensing units 6B0. In this embodiment, the pixel array 40 has 16*16 pixels, and is divided into 4 pixel blocks Sector0, Sector1, Sector2, and Sector3. The plurality of image sensing units 6B0 of the $k^{th}$ row of the pixel block Sector x is controlled by a reset signal RST[k+4x], a control signal TX[k+4x], and a selecting signal SELECT[k+4x], in which x and k are integers from 0 to 3. When the image sensing units 6B0 of each row of the pixel block Sector0 sequentially expose, the image sensing units 6B0 of each row of the pixel block Sector1 are reset. When the image sensing units 6B0 of each row of the pixel block Sector1 sequentially expose, the image sensing units 6B0 of each row of the pixel block Sector2 are reset. When the image sensing units 6B0 of each row of the pixel block Sector2 sequentially expose, the image sensing units 6B0 of each row of the pixel block Sector3 are reset.

Figure 5:
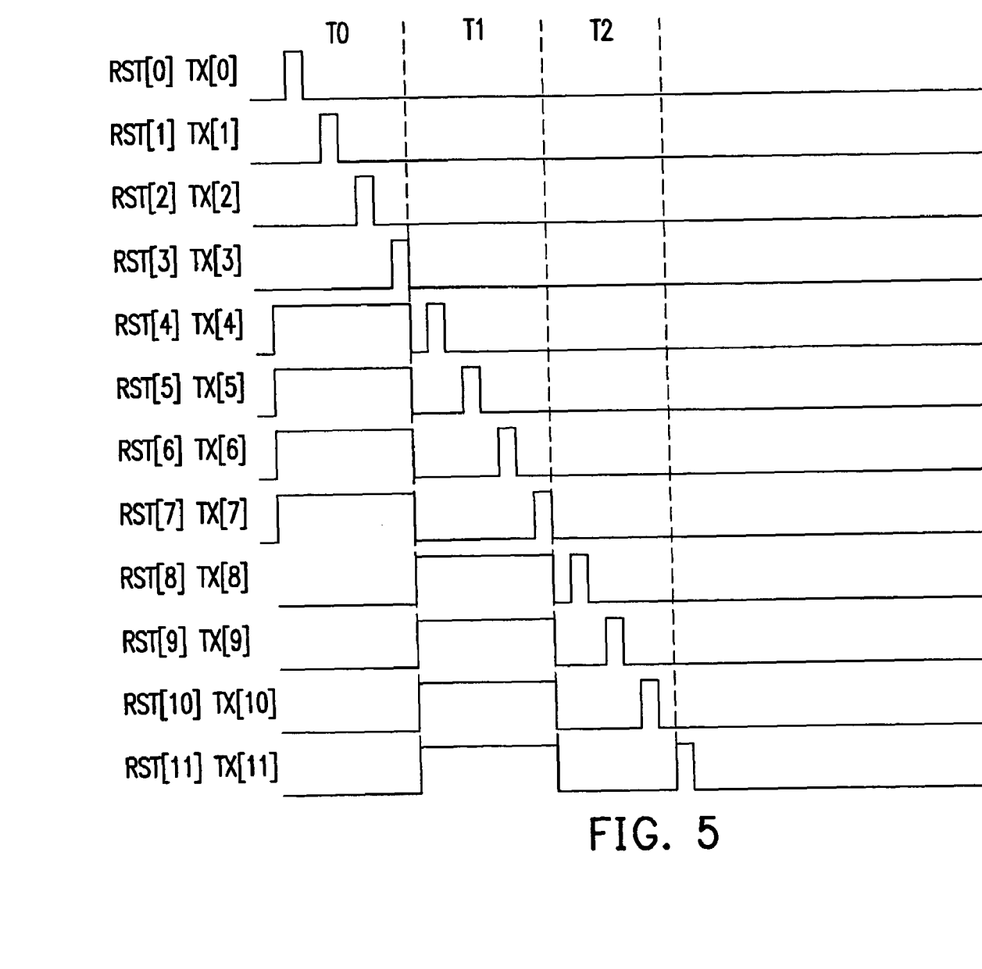
FIG. 5 is a diagram showing waveforms of reset signals RST[11:0] and control signals TX[11:0] of the pixel array 40 of the present invention.

Referring to FIG. 5, which is a diagram showing waveforms of reset signals RST[11:0] and control signals TX[11:0] of the pixel array 40 of the present invention is shown. RST[p:q] represents all the signals of RST[p]-RST[q], and TX[p:q] represents all the signals of TX[p]-TX[q]. At time T0, RST[3:0] and TX[3:0] sequentially change from a low level to a high level, such that the image sensing units 6B0 of each row of the pixel block Sector0 sequentially expose. When the image sensing units 6B0 of each row of the pixel block Sector0 sequentially expose, the image sensing units 6B0 of each row of the pixel block Sector1 are reset, and RST[7:4] and TX[7:4] continuously maintain a high level at time T0.

At time T1, RST[7:4] and TX[7:4] sequentially change from a low level to a high level, such that the image sensing units 6B0 of each row of the pixel block Sector1 sequentially expose. When the image sensing units 6B0 of each row of the pixel block Sector1 sequentially expose, the image sensing units 6B0 of each row of the pixel block Sector2 are reset, and RST[11:8] and TX[11:8] continuously maintain a high level at time T1.

At time T2, RST[11:8] and TX[11:8] sequentially change from a low level to a high level, such that the image sensing units 6B0 of each row of the pixel block Sector2 sequentially expose. When the image sensing units 6B0 of each row of the pixel block Sector2 sequentially expose, the image sensing units 6B0 of each row of the pixel block Sector3 are reset, and RST[15:12] and TX[15:12] continuously maintain a high level at time T2 (not shown in FIG. 5).

In the method of resetting image sensing provided in the above embodiment, at time T0, when the image sensing units of the pixel block Sector0 sequentially expose, the image sensing units of each row of the pixel block Sector1 are reset. At time T1, when the image sensing units of the pixel block Sector1 sequentially expose, the image sensing units of each row of the pixel block Sector2 are reset. At time T2, when the image sensing units of the pixel block Sector2 sequentially expose, the image sensing units of each row of the pixel block Sector3 are reset. Then, all the pixel blocks in the pixel array expose and are reset according to the manner. However, the arranging manner, for example, neighboring pixel blocks sequentially expose and are reset, is only directed to conveniently illustrate the method for resetting image sensing provided by the present invention, instead of limiting the sequence for all the pixel blocks to expose and reset. For example, when one of the pixel blocks exposes, another pixel block without being reset can be selected to be reset, which fall in the scope of the present invention.

In the method of resetting image sensing provided in the above embodiment, the pixel block is used as a unit for performing the resetting, the resetting time is increased, in addition, the image lag is reduced. In FIGS. 4 and 5, the image sensing units 6B0 of each row of the pixel block Sector0 can sequentially output the sensing signal PIX_

OUT[15:0] acquired by the exposing through the selecting signal SELECT[3:0] at time T1, that is, after the sensing signal PIX_OUT[15:0] of the first row is output, the sensing signal PIX_OUT[15:0] of the second row is output, and the rest can be deduced by analogy for the remaining rows.

In addition, the embodiment of FIGS. 5 and 4 is the 16*16 pixel array 40, and the 16*16 pixel array 40 has 4 pixel blocks Sector0-Sector3, which is illustrated for sake of convenience, and those skilled in the art should know modification can be made on sizes of the pixel array and the pixel block according to different conditions, therefore, the above embodiment is not used to limit the present invention.

The pixel array 40 is actually a CMOS pixel array, and the image sensing unit 6B0 is actually a CMOS image sensing unit, but the above implementations are not used to limit the present invention.

Figure 6A:
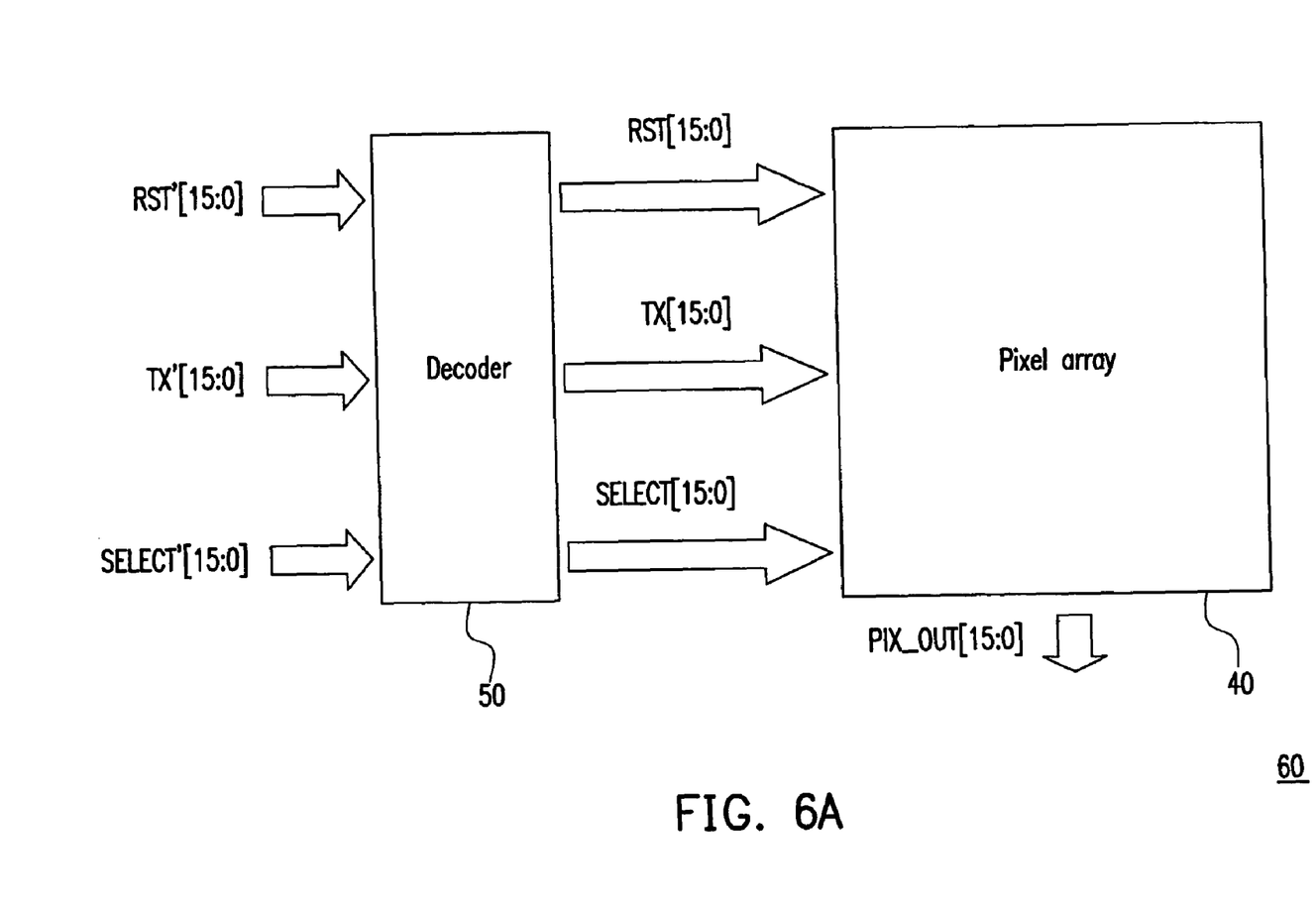
FIG. 6A is a circuit diagram of an embodiment of an image sensing device 60 of the present invention.

Referring to FIG. 6A, a circuit diagram of an embodiment of an image sensing device 60 of the present invention is shown. As shown in FIG. 6A, the image sensing device 60 includes a pixel array 40 and a decoder 50, in which the pixel array 40 is coupled to the decoder 50. The pixel array 40 is the same as the pixel array 40 of FIG. 4, so it is not described here. The decoder 50 is used to generate the reset signal RST[15:0], the control signal TX[15:0], and the selecting signal SELECT [15:0]. The decoder 50 can decode the conventional reset signal RST[15:0], the conventional control signal TX[15:0], and the conventional selecting signal SELECT[15:0] into the reset signal RST[15:0], the control signal TX[15:0], and the selecting signal SELECT[15:0], such that the pixel array 40 can be reset and expose according to the above-mentioned operations of the present invention.

Figure 6B:
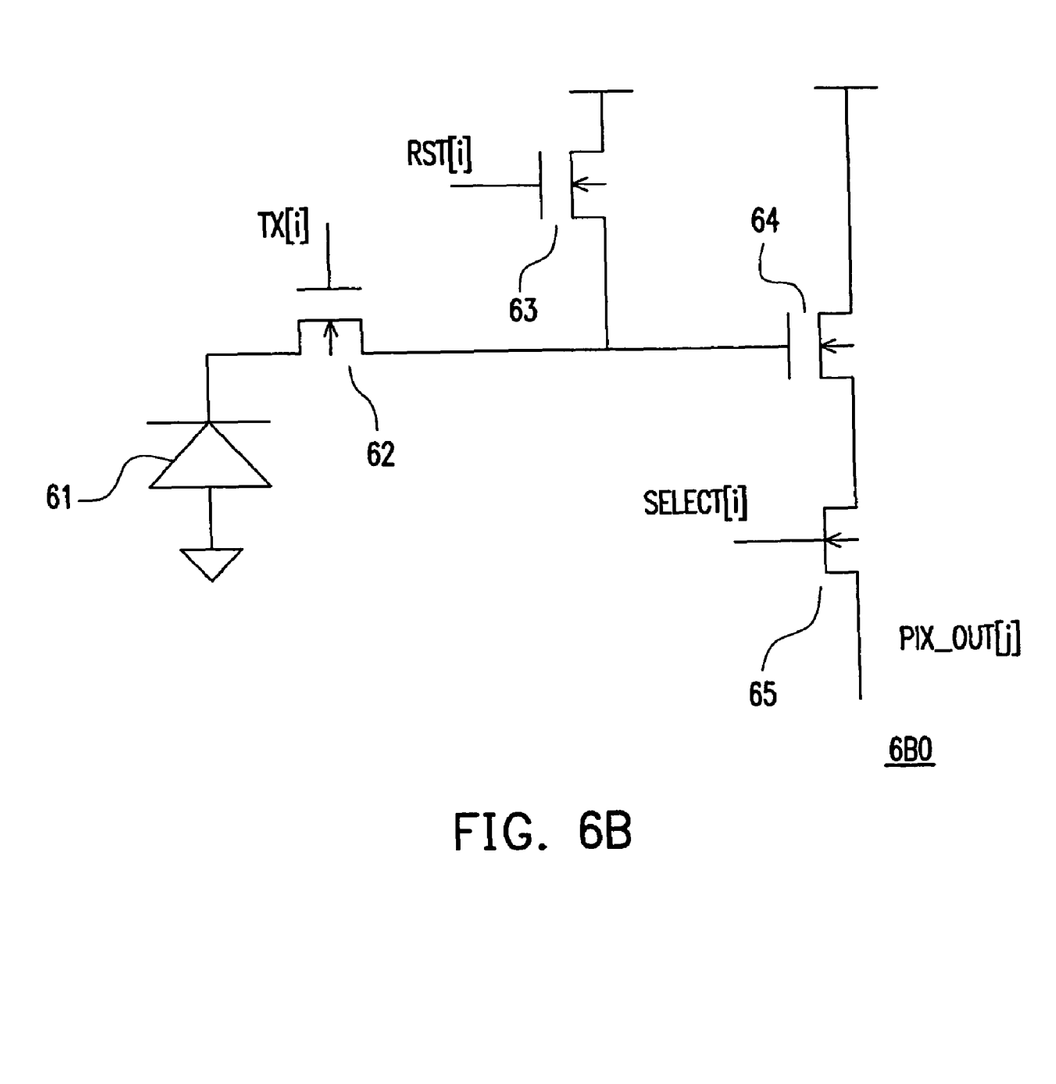
FIG. 6B is a circuit diagram of an embodiment of an image sensing unit 6B0.

Referring FIG. 6B, a circuit diagram of an embodiment of the image sensing unit 6B0 is shown. The image sensing unit 6B0 can be a CMOS image sensing unit, and the image sensing unit 6B0 includes a photodiode 61, and transistors 62, 63, 64, and 65. The transistor 62 is coupled to the photodiode 61, the transistor 63 is coupled to the transistor 62, the transistor 64 is coupled to the transistor 63, and the transistor 65 is coupled to the transistor 64. The photodiode 61 is used for exposing to acquire the sensing signal, the transistor 62 is controlled by the control signal TX'[i], the transistor 63 is controlled by the reset signal RST'[i], the transistor 65 is controlled by the selecting signal SELECT'[i], and the transistor 65 is used for outputting the sensing signal PIX_OUT [j] and the signal level after resetting, in which i and j are integers from 0 to 15.

Figure 7:
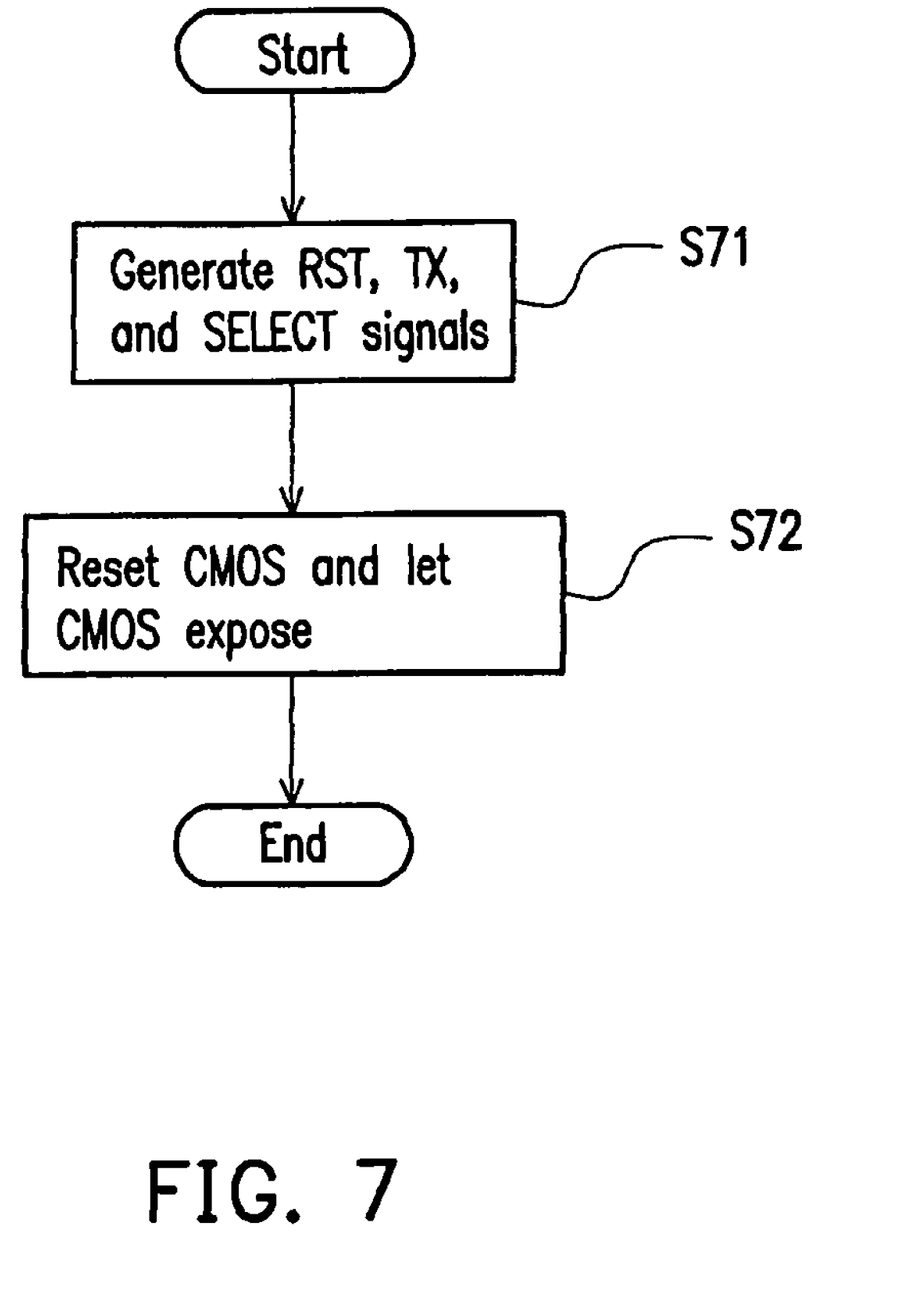
FIG. 7 is a flow chart of the resetting method provided by an embodiment of the present invention.

Next, referring to FIG. 7, a flow chart of the resetting method provided by the embodiment of the present invention is shown. The detailed steps of the resetting method are as follows. Firstly, in step S71, a decoder is provided to generate a plurality of reset signals and a plurality of control signals. Next, in step S72, the plurality of reset signals and the plurality of control signals are used to control the pixel array to reset and expose, in which the pixel array has n pixel blocks, and n pixel blocks each have a plurality of pixel sensing units. When the plurality of pixel sensing units of one of the pixel blocks sequentially expose to acquire a plurality of sensing signals, the pixel sensing units of another pixel block are reset. The decoder further generates a plurality of selects signals for controlling a plurality of pixel sensing units to output the plurality of sensing signals. In addition, the pixel sensing unit can be a CMOS pixel sensing unit.

To sum up, the resetting method and the image sensing device provided by the embodiment of the present invention has advantages of low image lag, without using voltage pump, low noise, and longer resetting time. The image sensing device of the present invention is implemented by only adding a decoder in front of the conventional pixel array without using any complex circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for resetting image sensing, applicable to an image sensing operation of a pixel array, the pixel array comprising a plurality of pixel blocks, each of the plurality of pixel blocks comprising a plurality of rows, each row having a plurality of pixel sensing units, the pixel blocks comprising a first through third pixel blocks, and the first through third pixel blocks are not overlapped, the method comprising:

generating a plurality of reset signals and a plurality of control signals;

during a first time period, the rows of the first pixel block are sequentially exposed, and all the rows of the second pixel block are reset; and during a second time period after the first time period elapses, the rows of the second pixel block are sequentially exposed, and all the rows of the third pixel block are reset.

2. The method for resetting image sensing according to claim 1, further comprising:

generating a plurality of selecting signals; and using the selecting signals to control the pixel sensing units to output the sensing signals.

3. An image sensing device, comprising:

a decoder, for generating a plurality of reset signals and a plurality of control signals; and a pixel array, coupled to the decoder, controlled by the reset signals and the control signals, and comprising a plurality of pixel blocks, wherein each of the plurality of pixel blocks comprises a plurality of rows, each row has a plurality of pixel sensing units, the pixel blocks comprising a first through third pixel blocks, and the first through third pixel blocks are not overlapped, wherein during, a first time period, the rows of the first pixel block sequentially are exposed, and all the rows of the second pixel block are reset; and during a second time period after the first time period elapses, the rows of the second pixel block sequentially are exposed, and all the rows of the third pixel block are reset.

4. The image sensing device according to claim 3, wherein the decoder is further used to generate a plurality of selecting signals for controlling the pixel sensing units to output the sensing signals.

5. The image sensing device according to claim 4, wherein each pixel sensing unit is a complementary metal-oxide-semiconductor (CMOS) pixel sensing unit.

6. The image sensing device according to claim 5, wherein the CMOS pixel sensing unit comprises:

a photodiode, for exposing to acquire one of the sensing signals;

a first transistor, coupled to the photodiode, and controlled by one of the control signals;

a second transistor, coupled to the first transistor, controlled by one of the reset signals;

a third transistor, coupled to the second transistor; and a fourth transistor, coupled to the third transistor, controlled by one of the selecting signals, and comprising a sensing signal output end.

* * * * *